United States Patent [19]

Castleberry et al.

[11] Patent Number: 4,520,357
[45] Date of Patent: May 28, 1985

[54] ELECTROSCOPIC INFORMATION DISPLAY AND ENTRY SYSTEM WITH WRITING STYLUS

[75] Inventors: Donald E. Castleberry, Schenectady; Charles A. Becker, Rexford, both of N.Y.

[73] Assignee: General Electric Company, Schenectady, N.Y.

[21] Appl. No.: 401,191

[22] Filed: Jul. 23, 1982

[51] Int. Cl.$^3$ .............................................. G09G 3/34
[52] U.S. Cl. ..................................... 340/783; 340/706; 340/712; 340/764; 340/815.05; 340/815.27; 340/365 L; 340/365 C; 178/18
[58] Field of Search ............... 340/706, 707, 708, 783, 340/787, 763, 815.05, 365 L, 764, 815.27, 815.29; 178/18

[56] References Cited

U.S. PATENT DOCUMENTS

| | | | |
|---|---|---|---|
| 3,881,131 | 4/1975 | Schott | 340/706 |
| 4,074,253 | 2/1978 | Nadir | 340/815.05 |
| 4,224,615 | 9/1980 | Penz | 340/712 |
| 4,290,061 | 9/1981 | Serrano | 340/712 |
| 4,405,921 | 9/1983 | Mukaiyama | 340/712 |
| 4,420,896 | 12/1983 | Castleberry | 340/763 |

Primary Examiner—Gerald L. Brigance
Attorney, Agent, or Firm—Geoffrey H. Krauss; James C. Davis, Jr.; Marvin Snyder

[57] ABSTRACT

Information is written into a matrix-addressed electroscopic display by means of a writing stylus having a magnetic tip, utilized to attract a moveable plate electrode in a selected one of the display matrix cells. A capacitance detector, connected to sequential ones of the column electrodes of the display via a first multiplexer and to sequential ones of the row electrodes of the matrix display via a second multiplexer, detects the change in cell interelectrode capacitance caused by movement of the moveable plate electrode. The capacitance of each display cell is compared with the data for the output state commanded for that cell, to recognize input data sites programmed by the magnetic writing stylus.

7 Claims, 3 Drawing Figures

ELECTROSCOPIC INFORMATION DISPLAY AND ENTRY SYSTEM WITH WRITING STYLUS

BACKGROUND OF THE INVENTION

The present invention relates to interactive information displays and, more particularly, to an electroscopic matrix-addressed display having a data input capability provided by a magnetic stylus.

Electroscopic information output displays are described and claimed in co-pending U.S. patent application Ser. No. 303,275, filed Sept. 17, 1981, now U.S. Pat. No. 4,420,896, issued Dec. 20, 1983, and incorporated herein by reference in its entirety. These electroscopic displays are bi-stable displays, typically of the matrix type, in which displayed information is stable as long as a holding voltage is applied. If the voltage at a display cell is briefly reduced below a first value, the cell will turn "off" and become highly light-absorptive, whereas if the voltage at a particular cell is briefly increased above a second value, the cell will turn "on" and become highly light-reflective. Thus, a potentially low-cost, multiplexible output information display is provided.

For interactive information devices, an input data capability is required as well as the data output display capability. If a separate data input device is utilized, the cost is typically significantly increased; if two physically-separated devices are utilized, parallax and registration problems are often encountered. It is therefore highly desirable to provide an electroscopic display device having a data input capability, whereby the input and output functions can be combined in a single relatively-flat panel device.

BRIEF SUMMARY OF THE INVENTION

In accordance with the invention, an electroscopic information display and entry system utilizes an electroscopic display device having a multiplicity of data display cells arranged in a matrix, with cell driving means configured to individually activate each of the multiplicity of information display cells in the matrix. A writing stylus is provided for activating individual ones of previously-unactivated cells to add information to the output display. Capacitance or other detector means scan the cell matrix to detect all activated cells, with means being provided for distinguishing between cells activated responsive to output information and cells activated responsive to the writing stylus and representing input information.

In a presently preferred embodiment, the activated cells are detected by a variation in dispaly cell capacitance. Row and column multiplexing means and capacitance detecting means are provided for scanning the matrix and providing activated cell data to a microcomputer, having output display cell information stored in a memory portion thereof. Any activated cell not previously commanded to an active condition for output of data is recognized as an input-data-containing cell.

Accordingly, it is an object of the present invention to provide a novel electroscopic display system having a writing stylus to facilitate input of new information utilizing the information-output display.

This and other objects of the present invention will become apparent upon consideration of the following detailed description, when read in conjunction with the drawings.

DETAILED DESCRIPTION OF A PRESENTLY PREFERRED EMBODIMENT

Figure 1:
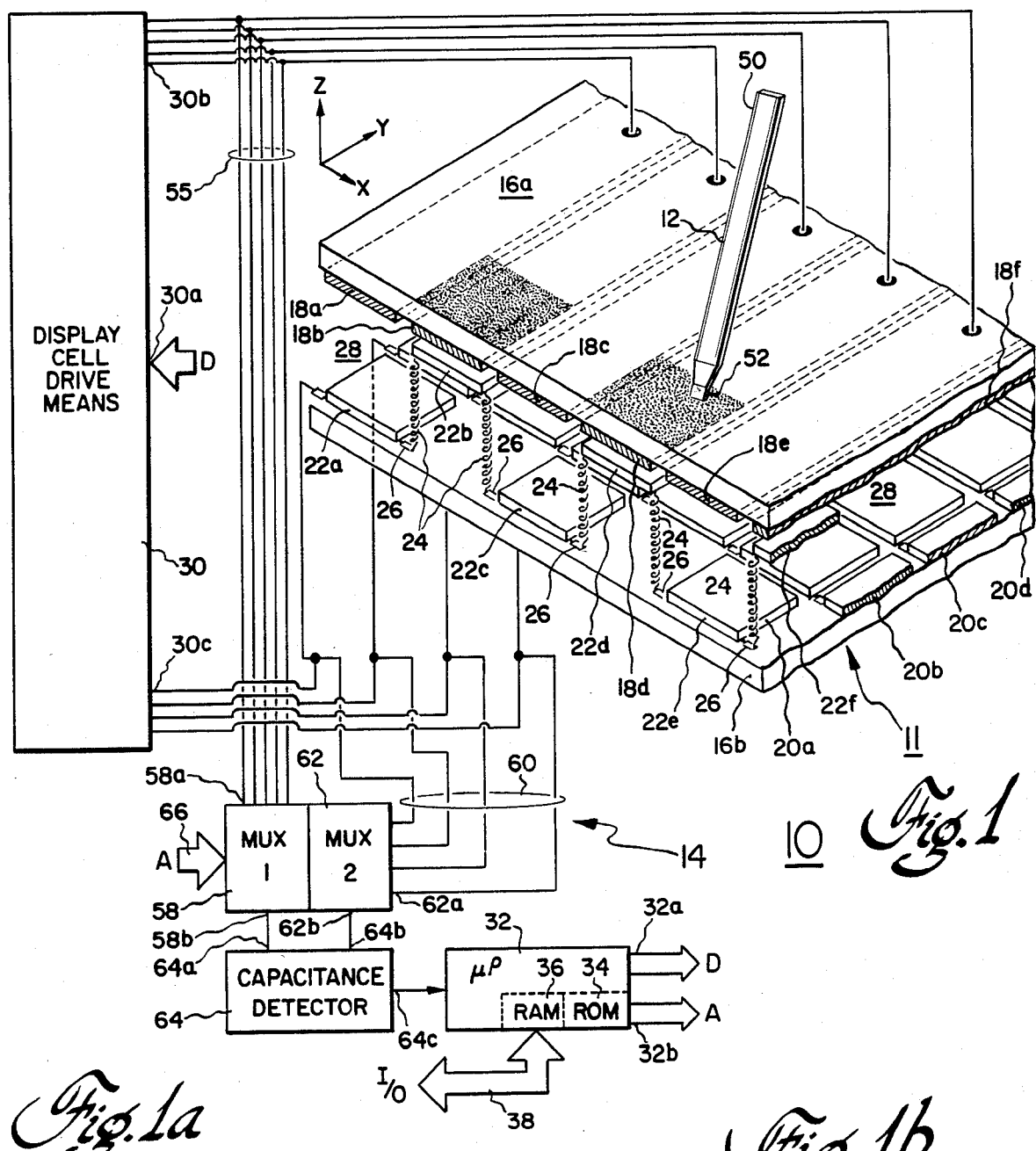
FIG. 1 is a perspective view of a portion of an electroscopic display and writing stylus in conjunction with a schematic representation of system electronics, in accordance with the principles of the present invention.

Referring now to the drawings, an electroscopic information entry and display system 10 utilizes an electroscopic display 11, a writing stylus 12 and an electronic input/output (I/O) subsystem 14.

Display 11 has a substantially transparent front substrate 16a spaced from a rear substrate 16b. A plurality of substantially transparent, conductive column electrodes 18 (e.g the 6 column electrodes 18a–18f shown) are arranged substantially parallel to one another upon the interior surface of front substrate 16a, facing rear substrate 16b. Each of column electrodes 18 is insulated from all other column electrodes, and each column electrode extends in a first direction, e.g. along the Y axis. A plurality of row electrodes 20 (e.g. the four row electrodes 20a–20d) are each positioned parallel to, and insulated from, one another upon the interior surface of rear substrate 16b and extend in a direction, e.g. along the X axis, perpendicular to the direction in which column electrodes 18 extend. Each of row electrodes 20 includes a plurality of moveable plate portions 22, e.g. the moveable plate portions 22a–22f of first row electrode 20a, joined by juxtaposed spring arm portions 24 to support portions 26 fixedly positioned upon the interior surface of rear substrate 16b. The volume between the rear-substrate-supported row electrodes 20 and the front-substrate-supported column electrodes 18 is filled with a light-absorbing fluid 28, retained between the substrates by suitable sealing means (not shown).

As more fully described in the abovementioned U.S. Pat. No. 4,420,896, assigned to the assignee of the present application and incorporated herein by reference, light entering through front substrate 16a is essentially absorbed within fluid 28 when a moveable plate portion, such as row plate portion 22a, is adjacent to the rear substrate 16b. Only when the moveable plate portion is adjacent to the front substrate, as shown by the position of row electrode moveable portion 22b, is light reflected from the front surface of the moveable plate portion 22b, to re-emerge from front substrate 16a and be visible to an observer. This movement of moveable portions 22 is obtained by connecting opposite polarity potentials to the row and column electrodes to establish an electrostatic force at the associated crosspoint of the display element matrix. This resulting electrostatic force moves the low-mass moveable plate portion in the Z direction from a rest position adjacent to the rear substrate interior surface to an actuated position adjacent to the front substrate interior surface.

The potentials required to move a moveable plate portion 22 are provided by a display cell drive means 30. Drive means 30 has an input 30a, receiving, in this configuration, a plurality of digital data input D lines. Responsive to the data at input 30a, drive means 30 provides a plurality of column drive signal lines at a first output 30b, with each line being individually connected to an associated one of column electrodes 18. Also responsive to the data at driver input 30a, a second drive means output 30c provides a plurality of row drive signal lines, each individually connected to an associated one of the row electrodes 20. A microprocessor 32, having appropriate read-only memory 34 and random-access read/write memory 36, receives digital display information from a bidirectional input/output (I/O) bus 38 and provides, at a microprocessor output 32a, the required digital D signals to display cell drive means 30.

Figure 1A:
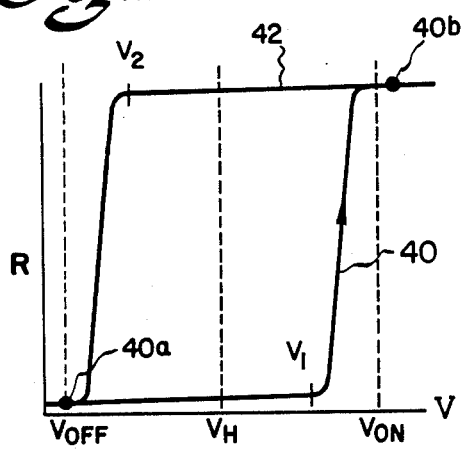
FIG. 1a is a graphical representation of the light-reflectivity versus voltage characteristic of a cell of the electroscopic display, and useful in understanding principles of operation of the present invention.
Figure 1B:
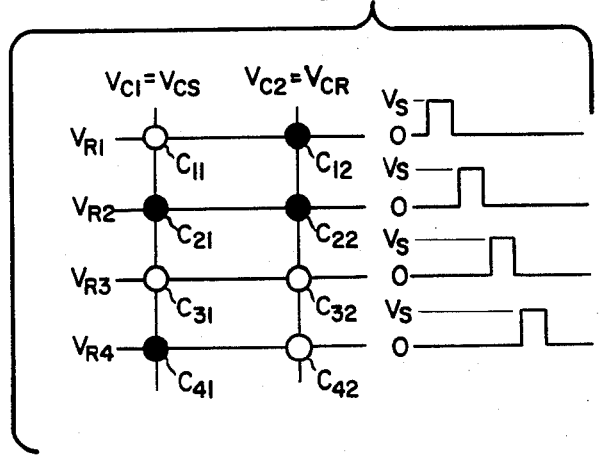
FIG. 1b is a schematic representation of a portion of the display under one set of operating conditions, and also useful in understanding principles of the present invention.

Thus, responsive to the digital data input on bus 38, display cell drive means 30 provides the required column and row cell matrix-addressing potentials at outputs 30b and 30c to cause each cell to be matrix-addressed and operated to a designated "on" or "off" condition. Each display cell has a characteristic as shown in FIG. 1a, wherein increasing value of the cell reflectance R are plotted along the ordinate for cell voltages V (the absolute value fo the difference in voltage between a particular row electrode and a particular column electrode) plotted with increasing value along the abscissa. When an initially-inactive display cell (defined by a particular moveable electrode portion 22) receives a relatively low cell voltage, the cell is operating at point 40a; the plate portion is at rest adjacent to the rear substrate, and the cell has a very low reflectivity R. As the cell voltage is increased, a voltage $V_1$ is reached at which the moveable plate is attracted to the front substrate; at cell-on voltage $V_{ON}$ the plate has moved to the actuated position adjacent to the front electrode, at which position relatively high cell reflectivity occurs. Having moved along curve portion 40 to a high-reflectivity portion at point 40b, a plate portion (e.g. portion 22b) remains adjacent to the front substrate as the potential across that cell is reduced (i.e. the cell now operates along line 42); at some potential $V_2$ the energy stored in spring arms 24 begins to move the plate portion 22 back toward the rear substrate. At some cell-off voltage $V_{OFF}$, the plate has returned to its position adjacent to the rear substrate, with a relatively low cell reflectivity R. The cell-deactivation curve 42, being different from the cell-activation curve 40, provides a hysteresis characteristic useful in multiplexing the cells of the display array 11. Thus, if a holding voltage of absolute value $V_H$ is provided to the cell, as by connection of that voltage to all column electrodes while the row voltages $V_R \approx 0$, the individual cells will remain in that one of the "on" or "off" conditions previously established. To change the state of the cells in a row, the row voltage, which is normally at a substantially zero potential, is pulsed to some switching potential magnitude $V_S$; the state of a cell on the switching row and along a particular column, will be reset or set, respectively, if a column voltage of respective magnitude $V_{CR}$ or $V_{CS}$ is applied. The column voltages are of absolute value approximately $V_S$, but of opposite polarity, i.e., $V_{CR} \approx V_S$ and $V_{CS} \approx -V_S$. Thus, the net voltage across a cell-to-be-reset is $V_{CR} - V_S \approx 0$ and is less than $V_{OFF}$; the net voltage across a cell-to-be-set is $|V_{CS} - V_S| \approx 2 \cdot |V_S|$ and is greater than $V_{ON}$. Both the set and reset voltages are of magnitude approximating the holding voltage, to hold cells not then being matrix-addressed. As shown in FIG. 1b, the row voltages $V_{R1}-V_{R4}$ are sequentially scanned (with the waveforms shown on the right-hand side of FIG. 1b) and the state of a column voltage $V_{C1}$ or $V_{C2}$ is varied to either hold or place the associated display cell in the reflective "bright" or absorptive "dark" state. For example, if column voltage $V_{C1}$ is made equal to the set voltage $V_{CS}$ and the column voltage $V_{C2}$ is made equal to the reset voltage $V_{CR}$, then when the first row is enabled by $V_{R1}$ pulsing up to $+V_S$ volts, the cell $C_{11}$ is turned on (becomes bright) due to the increased net voltage $(V_{CS} - V_S)$ thereacross. The voltage $(V_{CR} - V_S)$ across cell $C_{12}$ is less than $V_{OFF}$ and cell $C_{12}$ is turned off (becomes dark). Cells $C_{21}-C_{42}$ remain unaffected while only $V_{r1}$ is pulsed. When other row voltages (e.g. $V_{r2}$) are pulsed, the state of the cells of that row (e.g. $C_{21}$ and $C_{22}$) change in accordance with the voltages on the associated column lines.

The foregoing briefly describes the operation of system 10 as a digital-input/visual-output graphics display device. A graphics-input/digital-output capability is obtained, in accordance with the invention, by utilization of writing stylus 12. Stylus 12 includes a non-magnetic shaft 50 tipped with a permanent magnet member 52. The display cell moveable plate portions 22 are fabricated of a magnetic material, such as iron, nickel, cobalt and the like; the presence of magnetic writing tip 52 adjacent to the front substrate front surface magnetically attracts the moveable portion 22 thereunder, e.g. as shown by the movement of first row fourth plate portion 22d to a position adjacent to the front substrate. The operator notes that the cell defined by that plate portion 22d now has higher reflectivity, becoming an additional lighted portion of the display. The activated cells are compared with data concerning the cells enabled responsive to output data, to determine which cell had had the plate therefor moved by stylus 12 and represents input data.

The electronic subsystem 14 is configured, in accordance with one aspect to the present invention, to detect the change in capacitance of each moveable plate portion 22 moved from its rest position adjacent to the rear substrate 16b, to the actuated position adjacent to front substrate 16a. Each of the column electrodes 18 is connected through an individual one of a like plurality of conductors 55 to the associated one of a like number of inputs 58a of a first multiplexer (MUX 1) means 58. Similarly, each of the row electrodes is connected through an associated individual one of a like plurality of conductors 60 to the associated one of the inputs 62a of a second multiplexer (MUX 2) means 62. The single output 58b of the first MUX means 58 is connected to a first input 64a of a capacitance detector means 64 while the single output 62b of the second MUX means 62 is connected to a second capacitance detector input 64b. A capacitance detector means output 64c provides a binary signal, having a first binary voltage level (e.g. a logic 0 level) thereat if capacitance detector means 64 detects a first, e.g. relatively low, capacitance level between input leads 64a and 64b, and another binary voltage level (e.g. a logic 1 level) if detector means 64 detects another, e.g. relatively high, capacitance between inputs 64a and 64b. The capacitance between inputs 64a and 64b is the capacitance between the front-substrate column electrode and rear-substrate row electrode of that matrix cell connected through the first and second MUX means. The multiplexer means 58 and 62 are sequentially scanned to each of the display matrix points responsive to digital selection information A received by a bus 66 from a second output 32b of the microprocessor. Thus, the microprocessor sends signals on bus 66 causing all of the rows to be scanned by second multiplexer 62 during the time that one of the columns is selected by first multiplexer 58, and then rescans all rows for the next selected column, until all columns have been selected, in repetitious sequence. Specifically, at the start of a sequence, first multiplexer 58 is commanded to connect the first column electrode 18a to capacitance detector input 64a; all of the row electrodes 22 are then scanned by appropriate commands to second multiplexer 62. While the row electrodes are scanned, the detector means output 64c provides a digital representation of the individual cell capacitance. Thus, while the plate portion 22a of row electrode 20a is in the rest position, the capacitance detected is relatively low and a logic 0 level appears at capacitance detector output 64c. Microprocessor 32 compares this logic 0 level against the display data stored for that cell, defined by the first column and first row, and, upon ascertaining that the particular cell has an output data dark display state (which may be considered as a logic 0 state) determines that input data is not present at this cell. Similarly, the remaining row electrodes 20b, 20c, 20d, etc., associated with the first column are examined and the capacitance states thereof are interpreted with respect to the output data commanded therefor and stored in the microprocessor RAM memory 36, to determine if input data exists at a particular cell along the first column. After examining the entire first column, the first multiplexer MUX 1 input is shifted to the second column electrode 18b and all of the row electrodes are again examined by sequential selection through the second multiplexer MUX 2 means 62. Thus, with the second multiplexer means 62 connecting first row electrode 20a to the capacitance detector, a capacitance detector output logic 1 level is provided to the microprocessor 32, indicative of plate portion 22b being adjacent to column electrode 18b, i.e. in the high-capacitance condition. The microprocessor checks the data for this cell, and, upon finding that data had been sent to the display cell drive means input 30a actuating that cell to the reflective (bright) condition, the microprocessor determines that input data is not present at that cell site. A similar deterministic process is carried out for all other row electrodes associated with second column electrode 18b. Thereafter, first multiplexer MUX 1 means 58 connects the third column electrode 18c to the capacitance detector while all of the row electrodes 20 are scanned by second multiplexer MUX 2 means 62. When the fourth column electrode 18d is connected through first multiplexer means 66 to the capacitance detector and the second multiplexer means 62 connects first row electrode 20a to the other capacitance detector input, a logic 1 output level is provided at capacitance detector output 64c, responsive to plate portion 22d having been moved adjacent to the front substrate by magnetic attraction of writing stylus tip 52. This logic 1 level is compared with the data output level, for that cell, stored in RAM memory 36. As the cell defined by plate portion 22d was previously commanded, by data arriving via I/O bus 38, to be in the absorptive (or logic 0) state, the microprocessor 32 notes the discrepancy and determines that the high capacitance between moveable plate portion 22d and fourth column electrode 18d, is due to inputting of data at that cell site. This data input condition is stored at a memory location for that particular cell. After the entire multiplicity of display cells have been scanned and all similar data input sites have been determined, the location of such sites is output from microprocessor 32, via I/O bus 38, to other system portions (not shown).

Microprocessor 32 may, if so programmed, add the input data sites to the output data sites mapped into RAM memory 36, so that the new input data sites are permanently displayed as part of the overall output data display. Alternatively, the input data recovered by scanning the display matrix may be processed by the external portions of the system and utilized to provide new display data, on bus 38, to the microprocessor, whereby future display output data is affected.

While one presently preferred embodiment of our novel apparatus for writing input information into an electroscopic display with a magnetic stylus is described in detail herein, many variations and modification will now become apparent to those skilled in the art. It is our intent, therefore, to be limited only by the scope of the appending claims, and not by the specific details and instrumentalities presented by way of explanation herein.

What is claimed is:

1. An information display and energy system, comprising:
    an electroscopic display having a multiplicity of individually-actuatable display cells arranged in a matrix, each cell including a flat plate electrode of magnetically-attractable material and moveable between first and second positions substantially parallel, and with respect to, a fixed planar electrode to provide first and second respective display conditions;
    means for actuating the plate electrode of each individual one of said cells between said first and second display positions responsive to display data;
    means connectable between the cell plate electrode and the associated fixed electrode of an individual one of said display cells for measuring a change in the capacitance between the plate and fixed electrodes of said cell;
    means for sequentially connecting said measuring means to each of the cells of said display;
    a magnetic member completely external to said display and manually positionable adjacent to a selected cell to cause movement only of the plate electrode of that selected cell only from the first position to the second position;
    means for storing the display data determining the state of each display cell; and
    means connected to said storing means and separately connected to both said connecting means and said measuring means for determining, by comparison of matrix location data for each display cell with a relatively large total capacitance with the display data in said storing means, which of said cells, if any, has been acted upon by said external magnetic member to cause the total cell capacitance to increase responsive to data input to said system.

2. The system of claim 1, further comprising a non-magnetic stylus having said magnetic member attached to an end thereof.

3. The system of claim 1, wherein said display matrix includes a plurality of cell plate electrodes arranged along each of a plurality of rows each positioned substantially perpendicular to the orientation direction of each of a plurality of said fixed electrodes.

4. The system of claim 3, wherein said connecting means includes a first multiplexing means for sequentially and individually connecting each of said fixed electrodes to said measuring means.

5. The system of claim 4, further comprising a second multiplexing means for sequentially and individually connecting each of the plate electrode rows to said measuring means during connection of each individual one of the fixed electrodes to said measuring means by the first multiplexing means, to cause all of the cells of the entire matrix of said display to be sequentially and repeatedly connected to said measuring means.

6. The system of claim 1, wherein said storing means is a portion of a microprocessor; and said measuring means provides a binary data output to said microprocessor.

7. The system of claim 6, wherein said microprocessor includes a digital input/output port for receiving display data from, and for providing input data to, external apparatus.

* * * * *